United States Patent [19]
Murphy et al.

[11] 3,783,683
[45] Jan. 8, 1974

[54] MINIMIZING CLAY DAMAGE IN A LOG-INJECT-LOG PROCEDURE

[75] Inventors: Robert P. Murphy; Frank O. Jones, Jr., both of Tulsa, Okla.

[73] Assignee: Amoco Production Company, Tulsa, Okla.

[22] Filed: Dec. 27, 1971

[21] Appl. No.: 212,783

[52] U.S. Cl. .............................. 73/152, 250/83.6 W
[51] Int. Cl. ............................................ E21b 49/00
[58] Field of Search ............................ 73/152, 151; 250/83.6 W

[56] References Cited
UNITED STATES PATENTS 3,631,245   12/1971   Jorden, Jr. ................ 250/83.6 W X
3,628,011   12/1971   Wyman ..................... 250/83.6 W X

*Primary Examiner*—Jerry W. Myracle
*Attorney*—Paul F. Hawley et al.

[57] ABSTRACT

This invention relates to determining the oil saturation in an underground rock reservoir penetrated by a well such as by use of a log-inject-log technique. In some such techniques thermal neutron decay time logs are taken in the native state and then after fresh water injection. These logs are used in an equation to find oil saturation. This invention is directed to a method of treating the fresh water so that clay impairment or permeability loss is prevented but such that the neutron capture cross section of the treated water is not significantly different from that of fresh water.

3 Claims, No Drawings

MINIMIZING CLAY DAMAGE IN A LOG-INJECT-LOG PROCEDURE

CROSS REFERENCE TO RELATED APPLICATION

A closely related application is co-pending application Ser. No. 161,342 entitled "A Well Logging System" filed July 9, 1971, Robert P. Murphy, William W. Owens and Dwight L. Dauben inventors, and Ser. No. 212,513 entitled "Method of Logging a Sub-surface Formation" filed Dec. 27, 1971, Robert P. Murphy inventor.

BACKGROUND OF THE INVENTION

1. Field of the Invention

This invention relates to a method of logging a sub-surface formation penetrated by a well bore to determine oil saturation.

2. Setting of the Invention

In the planning or engineering of the production of oil from an underground formation, it is most important to know the amount of oil in place. The oil in such underground reservoirs is contained in the pores of the rock. However, these pores contain more than oil. It is known that all such pores also contain some water, commonly called connate or formation water. Quite frequently these pores also contain gas.

There are ways of determining the percent of rock volume which is pore space. One such way is to cut a core, which typically is a cylindrical piece of the rock which is 2 to 3 inches in diameter and usually 20 to 30 feet at a time. After recovery of the core to the surface its porosity is determined. However, the knowledge of the porosity of the rock does not give a complete knowledge of the amount of oil in the rock. One must still determine what part of the core pore space is filled with water, what part with oil, and what part with gas. One can measure the quantities of gas, oil, and water in the core that has been brought to the surface and determine the water, oil, and gas saturations in the core. However, experience has shown that the fluid content of the core at the surface is seldom the same as was the fluid content of the core in its natural condition in the reservoir. There are several reasons for this. One is that when any drilling operation takes place in a borehole, and this includes cutting of cores, there is always fluid in the well bore. This fluid is usually what is referred to as a drilling mud. The drilling fluid, whether oil base or water base, usually causes some contamination of the core which is cut by invasion of the core by mud filtrate. If the core is cut using conventional or rubber sleeve core barrels, by the time it reaches the surface, the expansion of gas in the pore space and that which is liberated from oil upon removal of pressure, drives fluid from the core. There have been attempts made to overcome this problem. The most notable example is the use of a pressure core barrel. A pressure core barrel is merely a device inserted in the drill string near the bit. As the core is cut it is received into the core barrel. After the core is cut and is being held in the core barrel, valves are closed so that the core is completely sealed within the barrel. The sealed barrel is then raised to the surface and measurements are then made of the fluid content of the core. This system gives improved results but is quite expensive.

There are no logging devices available that can measure formation oil saturation directly. By formation oil saturation we mean that percent of the fluid in the pore space of the reservoir rock that is oil. There are devices, however, which can provide a measure of the water saturation. (It should be noted, however, that experience has shown that water saturations can only be computed from these logging devices with an accuracy of ±15 percent). If a gas saturation exists, it can be measured by an independent method such as described in U.S. Pat. No. 3,282,095. The oil saturation can then be computed by a difference of the pore space of the rock not filled with water or gas. It should be noted that underground oil reservoirs which have been water-flooded normally contains no gas.

There are logs available for determining water saturations in wells which are cased. These are the thermal neutron decay time logs. The equation used in this interpretation is the equation (1) given below:

Thermal Decay Time Log $$S_w = (\Sigma_t - \Sigma_r)/\phi(\Sigma_w - \Sigma_{hc}) + (\Sigma_r - \Sigma_{hc})/(\Sigma_w - \Sigma_{hc}) \quad (1)$$

where $\Sigma_t$ = thermal neutron capture cross section of formation as measured by log.

$\Sigma_w$ = thermal neutron capture cross section of formation water. Can be predicted from chemical analysis of water.

$\Sigma_r$ = thermal neutron capture cross section of rock matrix. Is assumed from knowledge of lithology.

$\Sigma_{hc}$ = thermal neutron capture cross section of formation hydrocarbons. Estimated from oil gravity and formation pressure and temperature.

$\phi$ = porosity, fraction of bulk volume. Determined from core data and/or porosity logs.

The factor most difficult to derive for solving equation (1) is $\Sigma_r$. However, there are known ways to compute the formation water saturation without a knowledge of $\Sigma_r$. With this procedure the thermal neutron decay time log is obtained when the water in the pore space is a fresh water having a thermal neutron capture cross section nearly equal to that of the formation hydrocarbons. The equation used to compute the thermal neutron capture cross section of the rock matrix is $$\Sigma_r = (\Sigma_{ff} - \phi \Sigma_{hc})/(1 - \phi) \quad (2)$$

where $\Sigma_{ff}$ = thermal neutron capture cross section of formation after injecting fresh water having the same thermal neutron capture cross section as the formation hydrocarbon, a log measurement.

The usual procedure is to log the well in its true or native state and again after fresh water has been injected into the formation. This can be called a log-inject-log procedure. The equation used to compute the formation water saturation from this log-inject-log procedure by combining equations (1) and (2) is $$S_w = (\Sigma_t - \Sigma_{ff})/\phi(\Sigma_w - \Sigma_{hc}) \quad (3)$$

BRIEF DESCRIPTION OF THE INVENTION

In a logging technique in which it is required that fresh water be injected (so as to have a fluid in the pore space with the proper thermal neutron capture cross section), several problems can sometimes occur to the clay which is usually present in the formation. The clays in these formations are sometimes peptized or dispersed by the fresh water thereby resulting in permeability impairment. In other words, fluids will not flow as readily into or out of the formation as it would prior to the injection of the fresh water. We teach to use a water soluble divalent cation salt solution in which the anion of the salt selected (a) has a negligible thermal neutron capture cross section and (b) is compatible with the formation. This salt can be used in high enough concentrations in a water solution to prevent clay impairment but still retain low neutron capture capabilities of about the same values as that of fresh water.

DETAILED DESCRIPTION OF THE INVENTION

Although our invention can be used in any logging process where it is desired to inject fresh water followed by the running of a thermal neutron decay time log, it is believed simpler to first describe our method in connection with obtaining the terms found in equation (3) so that a complete logging process will be described. It will be recalled that in equation (3) the term $\phi$ which is porosity can be determined from core data, $\Sigma_w$ can be predicted from chemical analysis of the formation water, and $\Sigma_{hc}$ can be estimated from oil gravity formation pressure and temperature. Thus the term $\Sigma_t$ and $\Sigma_{ff}$ must be found by logging techniques. The obtaining of these terms can be described by preferred steps for obtaining such logs.

Step 1

The initial step is the conditioning of the well to produce as near as possible the same gas, oil, and water saturation adjacent the bore as that present in the rock formation remote from the well bore. All well logging techniques currently known measure physical properties of the rock formations and their fluid contents immediately adjacent the bore. There is some variation in effective depth of investigation, but at best this is only a few feet. On the other hand, it is well known to reservoir engineers that the relative content of gas, oil and formation water a considerable distance from the bore is frequently quite different from that near the bore. There are various reasons for this. For example, high production rates which usually results in a high pressure gradient between the well bore and the inner well area, frequently causes water or gas coning or gas liberation which alters the fluid saturation distribution of the formation near the well bore. As a different example, if a new well is drilled into a partly depleted formation, or if coring is carried out in an old well, the presence of the drilling fluid may introduce changes in saturations near the bore as compared to deeper in the formation. Thus, for example, if water or oil base mud is used in the drilling or coring, the filtrate will, depending upon the nature of the filtrate, cause too high a water or oil saturation in the core. Thus it is clear that it is desirable before commencing the logging operation to restore the formation as nearly as possible to steady-state conditions.

In general, we can usually condition the formation adjacent the well bore by controlled production. We produce the well at a very slow rate so as to have a small pressure drop between the well bore and the formation remote from the well. This permits the liquids present in the reservoir formation immediately adjacent the bore to approximate the saturations prevailing a considerable distance from the well bore in the reservoir rock. Thus the relative fluid content of the reservoir rock adjacent the well bore approaches the steady-state condition which exists in most of the reservoir.

One satisfactory initial step in a partly depleted reservoir having a known gas saturation greater than 20 to 30 percent pore space, if economics do not rule it out, is to drill a new well into a reservoir using gas under pressure as a drilling fluid. We have found that under these conditions the liquid saturations in the rock immediately surrounding the well bore are usually very little affected by the drilling operations.

Step I teaches to condition the well to produce as near as possible the same gas, oil and water saturation adjacent the bore as that present in the rock formation remote from the well bore. This step is essential whether gas saturation exists or not. However, it is to be noted that the overall procedure of this invention is slightly different for those situations where gas saturation exists and those where it does not. In continuing the explanation of our invention and particularly involving Steps II through IV, it will first be assumed that no gas saturation exists in the rock pore space. We will later describe a process for dealing with those situations in which gas saturation does occur.

Step II

We next run a thermal neutron decay device in the well bore to obtain a base log so that we can obtain the term $\Sigma_t$. We caution here that we must know the salinity of the water in the formation. One would ordinarily know the salinity of the formation water as this can be readily determined from the sample of produced water. However, if the field or reservoir has been waterflooded with the water of different salinity from that originally in the formation, we should proceed this Step II by injecting a salt water of known salinity into the zone of interest before running this base log.

Step III

In this step we prepare the formation so that we may obtain the log representative of the term $\Sigma_{ff}$. If there were no danger of causing permeability impairment to the treated formation, fresh water would now be injected. However, some formations are "fresh water sensitive." The clays in these formations are peptized or dispersed by the fresh water thereby reducing the permeability of the formation to the flow of fluids. It is known that water which contains sodium chloride can be used for injection into a formation and that if the concentration of the sodium chloride is sufficiently high clay impairment will be prevented. This is done in the recovery process known as waterflooding in which water is injected into one well to force oil out a second well. However, the neutron capture cross section of the resulting salt water is ordinarily considerably different from fresh water. The chloride has great neutron absorbtivity. A sodium chloride water solution of 50,000 ppm is sufficient to prevent clay impairment but has a thermal neutron capture cross section of 39.7 s.u. (sigma units) which is almost double that of water which is 22.2 s.u. A sigma unit is $10^{21}$ barns per cubic centimeter. A barn is $10^{-24}$ square centimeters.

We must use a water solution which can prevent clay impairment and not increase the neutron capture absorbtivity. Generally speaking we have found that we can use those divalent metal salts whose thermal neutron capture cross section of the cation is less than about $0.6 \times 10^{-24}$ cm$^2$ with an anion, none of whose constituents has a thermal neutron capture cross section greater than $0.6 \times 10^{-24}$ cm$^2$ which upon dissolving in water is sufficiently soluble and generates essentially neutral pH solutions. We use a minimum of about 3,000 ppm of such metal salt in water to prevent clay dispersion. Cations of suitable metals includes calcium and magnesium. A suitable anion is the sulfate radical. However, we have found that the only practical salt to use is Mg SO$_4$.

In carrying out a logging operation similar to the one described above we used 7½ lbs. of magnesium sulfate per barrel of water (approx. 20,000 ppm) in a well in the Sholem Alechem Field, Stephens County, Oklahoma. The neutron capture cross section of this solution was only about 23.0 s.u. which is essentially the same as that water which is 22.2 s.u. This solution was injected into intervals from 5,032 to 5,050, 5,060 to 5,070, 5,110 to 5,118, 5,130 to 5,146, 5,160 to 5,192, 5,203 to 5,209, and 5,228 to 5,234 feet. Injection into each interval was approximately 5 barrels per foot. The selection of the Mg SO$_4$ solution was effective as there was no evidence of any reduced permeability caused by clay dispersion.

Step IV

In this step we obtain $\Sigma_{ff}$. What we do is to run the log as in Step II.

The values of the log responses obtained in Steps II and IV which are representatives of $\Sigma_t$ and $\Sigma_{ff}$ are used in equation (3) to obtain $S_w$. If there is no gas present we can obtain the oil saturation by merely subtracting the value $S_w$ from 1. If there is gas present, which ordinarily there is not, modifications can be made as taught in the said application Ser. No. 161,342.

Each of these logs can be run a number of times and the responses averaged cancelling the effects of any statistical variations in the response which may occur. The average capture cross section is determined for each interval of interest and the oil saturation for that interval is determined.

Although the above description has been given in considerable detail, it is possible to make modifications in the procedure without departing from the spirit or scope of the invention.

We claim:

1. A method of minimizing clay damage in a subsurface zone containing formation oil and formation water penetrated by a well bore in logging said zone which comprises the steps of:

a. injecting a solution into the formation from the well bore, said solution being a divalent metallic salt whose cation has a thermal neutron capture cross section less than about $0.6 \times 10^{-24}$ cm$^2$ and having anions none of whose constituents has a thermal neutron capture cross section more than about $0.6 \times 10^{-24}$ cm$^2$ which upon dissolving in water generates essentially a neutral pH, the salt being at least 3,000 ppm in the solution, b. and then running a thermal neutron decay time log immediately following step (a).

2. A method as defined in claim 1 in which the metallic salt is Mg SO$_4$.

3. A method as defined in claim 2 in which the solution contains about 20,000 ppm of said Mg SO$_4$.

* * * * *